March 11, 1952 F. W. LINDBLOM 2,589,103
INLAID OPHTHALMIC MOUNTING METHOD
Filed Sept. 29, 1949
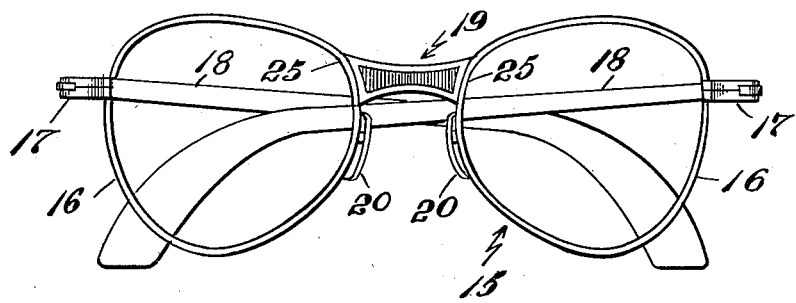
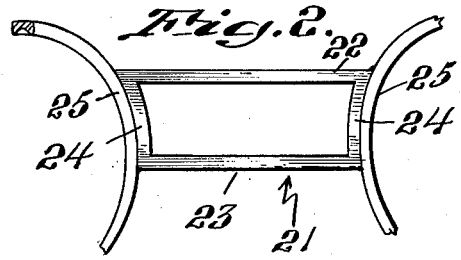
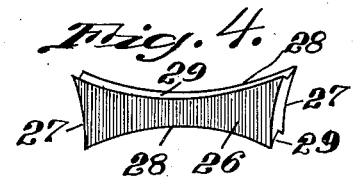
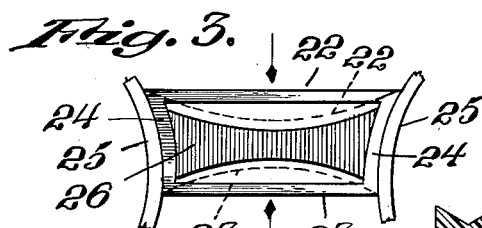
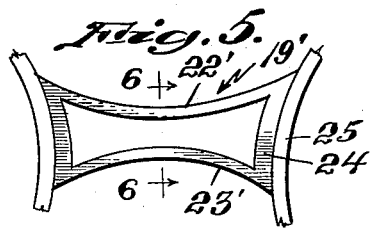
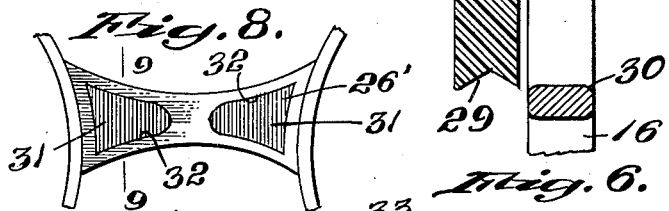
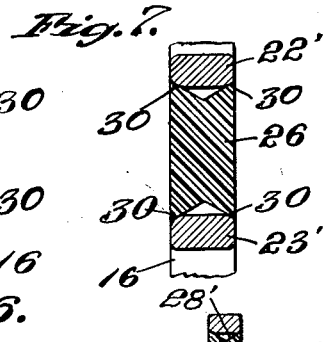
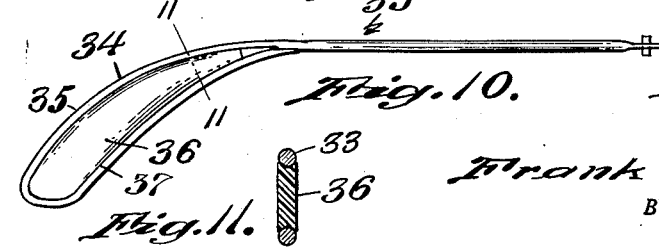
INVENTOR.
Frank W. Lindblom
BY
Barlow & Barlow
ATTORNEYS.

Patented Mar. 11, 1952

2,589,103

UNITED STATES PATENT OFFICE 2,589,103

INLAID OPHTHALMIC MOUNTING METHOD

Frank W. Lindblom, Warwick, R. I., assignor to Welsh Manufacturing Company, a corporation of Rhode Island Application September 29, 1949, Serial No. 118,695

1 Claim. (Cl. 41—35)

This invention relates to a metal ophthalmic mounting.

An ophthalmic mounting made of metal material is usually decorated to enhance the appearance thereof by marking on the parts thereof in a manner to simulate engraving. The bridge of this type of mounting is usually solid and does not lend itself to a two-tone decoration. This is also true of the temples thereof.

An object of this invention is the provision of a metal ophthalmic mounting with the bridge and temple parts thereof of such a construction as to be adapted for a two-tone color scheme decoration.

A more specific object of the invention is the provision of a metal ophthalmic mounting with the bridge and temple parts thereof of such a construction as to receive and retain a colored insert therein.

Another object of the invention is the provision of a metal ophthalmic mounting of such a construction as to provide a frame for receiving a color insert therein.

With these and other objects in view, the invention consists of certain novel features of construction, as will be more fully described and particularly pointed out in the appended claim.

In the accompanying drawings:

Figure 1 is a front view of an ophthalmic mounting embodying my invention;

Figure 2 is a view of a fragmental portion of the mounting shown in Figure 1 on an enlarged scale;

Figure 3 is a view similar to that shown in Figure 2 and with an insert in position to be attached in place;

Figure 4 is a perspective view of the insert shown in Figure 3;

Figure 5 is a view similar to that shown in Figure 2 of a modified construction of bridge;

Figure 6 is a sectional view taken substantially along line 6—6 of Figure 5 on a much enlarged scale and showing the insert in position to be received within the bridge;

Figure 7 is a similar view with the insert in position within the bridge;

Figure 8 is a front view of a further modification of bridge;

Figure 9 is a sectional view taken substantially along line 9—9 of Figure 8;

Figure 10 is a front view of a temple embodying the invention shown in the preceding figures; and Figure 11 is a sectional view taken substantially along line 11—11 of Figure 10.

In proceeding with the invention I make the bridge of the mounting in substantially a frame shape with an open center, the upper and lower sides of which may extend substantially parallel with each other. The ends of the frame are made on the curvature of the rims at the location of attachment to the said rims. Within this frame an insert is positioned which preferably is made of a non-metallic plastic material molded or otherwise formed to the desired shape. The end edges of the insert are made arcuate on the curvature of the ends of the said frame and the side edges concave and grooved. With the insert in proper position the said upper and lower sides of the frame are bent to seat the adjacent edges thereof in the grooves of the insert to secure the same therein. The insert may be made in various colors and easily assembled in position by the retailer at the time of sale.

In some instances the bridge frame may be pre-bent to the desired contour and the insert snapped into position.

Referring to the drawings for a more detailed description of the invention, 15 designates generally an ophthalmic mounting comprising lens rims 16 having temple mountings or end pieces 17 for attachment of the temples 18 to the rim. The rims are connected by a bridge 19 and have the usual nose pads 20 attached thereto.

Referring first to Figures 1 to 4, the bridge 19 is first made substantially rectangular with an open center which provides a frame structure 21. The upper and lower sides 22 and 23 of the said frame extend substantially parallel to each other and the end sides 24 extend on the curvature of the rim portions 25 at the location of attachment to the said rims, which attachment may be in a usual manner such as a solder connection. The remaining parts of the mounting may be assembled with the rims in a usual manner so as to provide an ophthalmic mounting complete but for the finishing of the bridge 19.

To complete the bridge 19 after assembling of the parts as above described, an insert 26 (see Figure 4) is positioned within the frame 21. The insert 26 is preferably made of a non-metallic plastic material of any desired color molded or otherwise formed with end edges 27 complementary to the sides 24 of the frame 21 and the side edges 28 concave. The side edges 28 are also provided with grooves 29 which may be V-shaped as shown. With the insert 26 in position within the frame 21, the sides 22, 23 (see Figure 3) are bent to seat the inner edges thereof into engagement with the walls of the grooves 29. The said inner edges have round corners so as to be seated sufficiently within the groove 29 to firmly hold the insert 26 in position.

In Figures 5 to 7 I have shown a similar bridge construction 19' but in which the longitudinal sides 22' and 23' are bent into concave form prior to inserting the insert 26 therein. In this construction the said insert is positioned adjacent to the inner edges of the form, as shown in Figure 6, and snapped into position to seat the inner edges of the sides 22' and 23' into engagement with the walls of the grooves of the insert. The bridge frame 19' is sufficiently resilient to yield and spread under pressure for the edges of the insert to snap in position. The corners of the inner edges of the sides 22' and 23' are also rounded as at 30 so as to seat the said sides sufficiently within the groove 29 of the insert to firmly hold the said insert in position.

In Figure 8 there is shown a further modification of bridge portion having a plurality of openings 31 therein and in which appropriate inserts 26' are snapped in a manner previously described in connection with the structure shown in Figures 5 to 7. The inserts 26' are, of course, formed with an appropriate contour and similar grooves 28' are provided for engagement with the inner edges 32 to retain the inserts 26' in position.

In Figures 10, 11, I have shown a similar manner of making a two-tone temple 33 which comprises forming the head-engaging portion 34 of the temple with a frame structure 35 of desired contour and an insert 36 having a similar complementary contour 37. The insert 36 is likewise snapped into position within the frame in a manner similar to that above described.

The inserts in each of the various constructions described may also be removable, thereby providing for interchangeability of inserts to change the two-tone color scheme. It will also be apparent that the inserts may be speedily and easily positioned and attached in place to the bridge and temple frame at the time of sale, thus permitting the retailer to advantageously stock a smaller inventory of mountings without inserts therein and a larger inventory of inserts in a wide color range to allow the purchaser a greater choice of two-tone color schemes.

I claim:

The method of making an ophthalmic bridge which consists of making the bridge in the form to provide an open center therethrough with a substantially straight lower portion and positioning an insert having grooved downwardly concave lower edge in said opening and bending said straight portion into the concave groove edge to hold the insert in place and provide a bridge with an arched lower edge to rest on the nose.

FRANK W. LINDBLOM.

REFERENCES CITED

The following references are of record in the file of this patent:

UNITED STATES PATENTS

| Number | Name | Date |
| --- | --- | --- |
| 248,785 | Pardee | Oct. 25, 1881 |
| 401,682 | Brust | Apr. 16, 1889 |
| 1,932,261 | Beatty | Oct. 24, 1933 |

FOREIGN PATENTS

| Number | Country | Date |
| --- | --- | --- |
| 369,355 | Great Britain | Mar. 24, 1932 |